(12) United States Patent
Han et al.

(10) Patent No.: US 11,663,127 B2
(45) Date of Patent: May 30, 2023

(54) METHOD, ELECTRONIC DEVICE AND COMPUTER PROGRAM PRODUCT FOR MANAGING STORAGE SYSTEM

(71) Applicant: EMC IP Holding Company LLC, Hopkinton, MA (US)

(72) Inventors: Geng Han, Beijing (CN); Jian Gao, Beijing (CN); Xinlei Xu, Beijing (CN); Yousheng Liu, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/469,321

(22) Filed: Sep. 8, 2021

(65) Prior Publication Data

US 2022/0237119 A1 Jul. 28, 2022

(30) Foreign Application Priority Data

Jan. 22, 2021 (CN) .......................... 202110087043.8

(51) Int. Cl.
*G06F 12/00* (2006.01)
*G06F 12/0804* (2016.01)

(52) U.S. Cl.
CPC .. *G06F 12/0804* (2013.01); *G06F 2212/1032* (2013.01)

(58) Field of Classification Search
CPC ................. G06F 12/0804; G06F 2212/1032
See application file for complete search history.

(56) References Cited

U.S. PATENT DOCUMENTS

| | | | |
|---|---|---|---|
| 7,380,059 B2 | 5/2008 | Burton | |
| 8,549,230 B1 * | 10/2013 | Chatterjee | G06F 3/0665 711/170 |
| 8,943,282 B1 | 1/2015 | Armangau et al. | |
| 9,697,219 B1 | 7/2017 | Wang et al. | |
| 2007/0136523 A1 * | 6/2007 | Bonella | G06F 12/0866 711/E12.019 |
| 2014/0115241 A1 * | 4/2014 | Wei | G06F 12/0246 711/103 |
| 2020/0192798 A1 | 6/2020 | Natu | |

* cited by examiner

*Primary Examiner* — Gurtej Bansal
(74) *Attorney, Agent, or Firm* — Bainwoodhuang

(57) ABSTRACT

Techniques for managing a storage system involve flushing a target page in a cache device to a persistent storage device of the storage system. The techniques further involve releasing a resource storing a page descriptor of the target page to a resource pool. The resource pool is configured to provide resources to store page descriptors of pages to be flushed in the cache device. The techniques further involve: if it is determined that an auxiliary descriptor of the target page is located at a tail of a queue of auxiliary descriptors of the pages to be flushed, removing the auxiliary descriptor of the target page from the queue. The auxiliary descriptors of the pages to be flushed are configured to describe the page descriptors of the pages to be flushed. Accordingly, the page flushing performance of the storage system can be improved, thereby improving the input/output performance.

20 Claims, 10 Drawing Sheets

METHOD, ELECTRONIC DEVICE AND COMPUTER PROGRAM PRODUCT FOR MANAGING STORAGE SYSTEM

CROSS-REFERENCE TO RELATED APPLICATION

This application claims priority to Chinese Patent Application No. CN202110087043.8, on file at the China National Intellectual Property Administration (CNIPA), having a filing date of Jan. 22, 2021, and having "METHOD, ELECTRONIC DEVICE AND COMPUTER PROGRAM PRODUCT FOR MANAGING STORAGE SYSTEM" as a title, the contents and teachings of which are herein incorporated by reference in their entirety.

TECHNICAL FIELD

Embodiments of the present disclosure relate to the field of data processing, and more particularly, to a method, an electronic device, and a computer program product for managing a storage system.

BACKGROUND

With the development of data storage technologies, various data storage devices have been able to provide users with increasingly high data storage capabilities, and the data access speed has also been greatly improved. While the data storage capabilities are improved, demands of users for the performance of a storage system are also increasingly high. Therefore, it is desired to effectively manage pages of user data in the storage system in order to better serve access requests from the users.

SUMMARY OF THE INVENTION

Embodiments of the present disclosure provide a solution for managing a storage system.

In a first aspect of the present disclosure, a method for managing a storage system is provided. The method includes flushing a target page in a cache device of the storage system to a persistent storage device of the storage system. The method further includes releasing a resource storing a page descriptor of the target page to a resource pool. The resource pool is configured to provide resources to store page descriptors of pages to be flushed in the cache device. The method further includes: if it is determined that an auxiliary descriptor of the target page is located at a tail of a queue of auxiliary descriptors of the pages to be flushed, removing the auxiliary descriptor of the target page from the queue. The auxiliary descriptors of the pages to be flushed are configured to describe the page descriptors of the pages to be flushed.

In a second aspect of the present disclosure, an electronic device is provided. The electronic device includes a processor and a memory coupled to the processor, and the memory has instructions stored therein. The instructions, when executed by the processor, cause the device to execute an action. The actions include flushing a target page in a cache device of a storage system to a persistent storage device of the storage system. The actions further include releasing a resource storing a page descriptor of the target page to a resource pool. The resource pool is configured to provide resources to store page descriptors of pages to be flushed in the cache device. The actions further include: if it is determined that an auxiliary descriptor of the target page is located at a tail of a queue of auxiliary descriptors of the pages to be flushed, removing the auxiliary descriptor of the target page from the queue. The auxiliary descriptors of the pages to be flushed are configured to describe the page descriptors of the pages to be flushed.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

The Summary of the Invention section is provided to introduce the selection of concepts in a simplified form, which will be further described in the Detailed Description below. The Summary of the Invention section is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one additional embodiment." The terms "first," "second," and the like may refer to different or the same objects. Other explicit and implicit definitions may also be included below.

Figure 1:
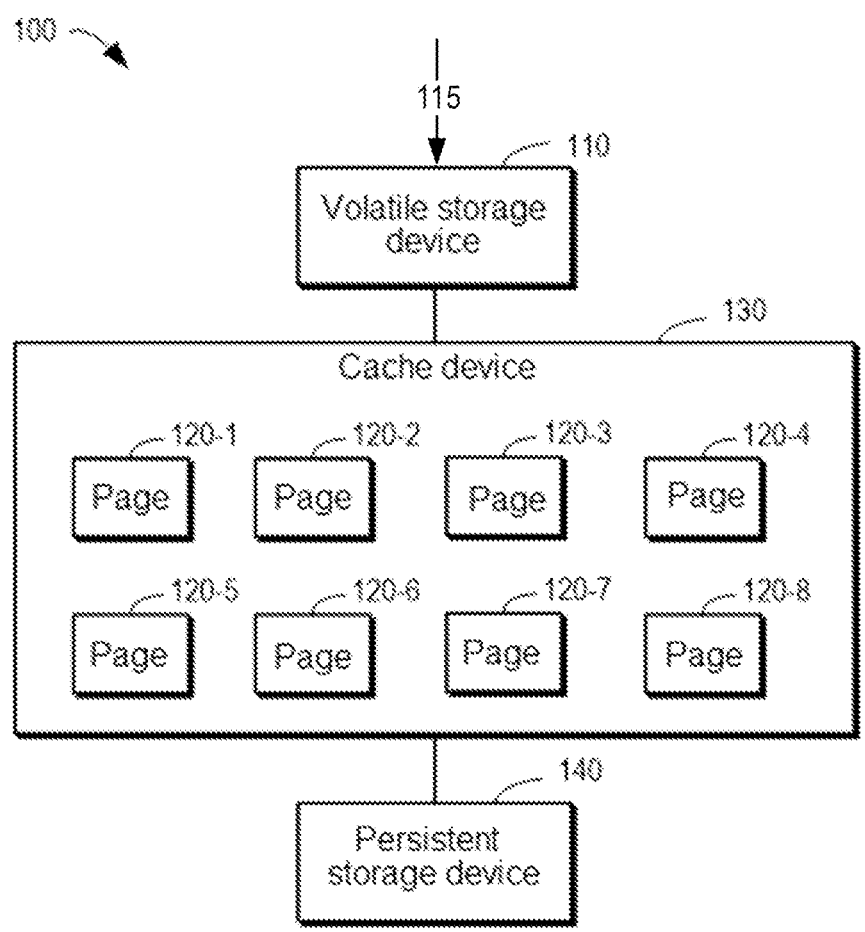
FIG. 1 shows a schematic diagram of a storage system in which an embodiment of the present disclosure may be implemented.

FIG. 1 shows a schematic diagram of storage system 100 in which an embodiment of the present disclosure may be implemented. As shown in FIG. 1, storage system 100 generally includes multi-level storage devices, for example, volatile storage device 110, cache device 130, and persistent storage device 140. It should be understood that the architecture and functions of environment 100 are described by way of example only, and do not imply any limitation to the scope of the present disclosure. The embodiments of the present disclosure may also be applied to environments involving data protection systems and having different structures and/or functions.

Volatile storage device 110 may include any suitable volatile memory, such as a dynamic random access memory (DRAM). Cache device 130 may include any suitable non-volatile cache, for example, a non-volatile memory express (NVMe) cache and a non-volatile dual in-line memory module (NVDIMM) cache. Persistent storage device 140 may include one or more storage disks, for example, a solid state disk (SSD), a magnetic disk, or an optical disk. It should be understood that implementations of volatile storage device 110, cache device 130, and persistent storage device 140 described herein are merely examples, and are not intended to limit the scope of the present disclosure. Any type of memory can be selected according to specific application scenarios to implement volatile storage device 110, cache device 130, and persistent storage device 140.

Storage system 100 serves access request 115 from a user device to provide data to a user or store the data for the user. When receiving a read request from a user device, data to be read may be retrieved from persistent storage device 140 (or other cache devices), and the retrieved data may be returned to the user device. When receiving a write request, in order to increase the response speed of storage system 100, data to be written may first be written in cache device 130, and a "successfully written" response may be returned to the user device.

At this point, the data in cache device 130 is "dirty data," which means that the data has been modified but has not been flushed to persistent storage device 140. Inside storage system 100, the dirty data in cache device 130 can be managed in a background mode. As storage system 100 operates, the dirty data in cache device 130 may continue to grow. The dirty data can be flushed to persistent storage device 140 at predetermined time intervals (or according to other triggering conditions).

For this reason, cache device 130 usually processes the data to be flushed to persistent storage device 140 in units of pages. FIG. 1 shows pages 120-1 to 120-8, which may also be collectively or individually referred to as page 120 or page 120 to be flushed. In order to manage such a page 120 to be flushed, a page descriptor (PD) of the page is maintained for each page inside storage system 100. The page descriptor can describe attributes of the page, which storage volume the page belongs to, which node the page comes from, and so on.

Conventionally, page descriptors of different pages are stored in the storage system in a circular queue according to the time when the corresponding page is written. A page descriptor of the latest written page is added to a head of the queue, and a page descriptor of the oldest page is at a tail of the queue. After the oldest page is flushed to the persistent storage device at the back end, its page descriptor is removed from the queue. The tail of the queue can be moved forward to release a storage resource used to store the page descriptor of the oldest page to the storage system.

However, a sequence in which the storage system flushes the pages in the cache device does not follow a time sequence in which the pages are written into the storage system. This makes the circular queue of the page descriptors move slower, and there are even cases where the circular queue becomes saturated. This will cause data input/output (I/O) delay and severe I/O control. Therefore, it is desired that the page descriptors of the pages can be managed more effectively to improve the performance of the storage system.

The embodiments of the present disclosure propose a solution for managing a storage system to solve one or more of the above problems and other potential problems. In, resources used to store the page descriptors are managed by the resource pool instead of the queue. In this way, after a page is flushed to the persistent storage device, the resource used to store the descriptor of the page can be released to the resource pool in time for use by the subsequent written page. In addition, in the storage system, resources used to store auxiliary descriptors of the pages are managed in queues, and the auxiliary descriptors are configured to describe the page descriptors of the pages. In this way, the arrangement of the auxiliary descriptors in the queue can reflect the time when the pages are written or modified, so that the time information will not be lost. A storage space allocated to the queue of the auxiliary descriptors may be redundant. In this way, a moving speed of the queue of the auxiliary descriptors will no longer be a primary influencing factor. In this way, the page flushing performance of the storage system can be improved, thereby improving the I/O performance.

Figure 2:
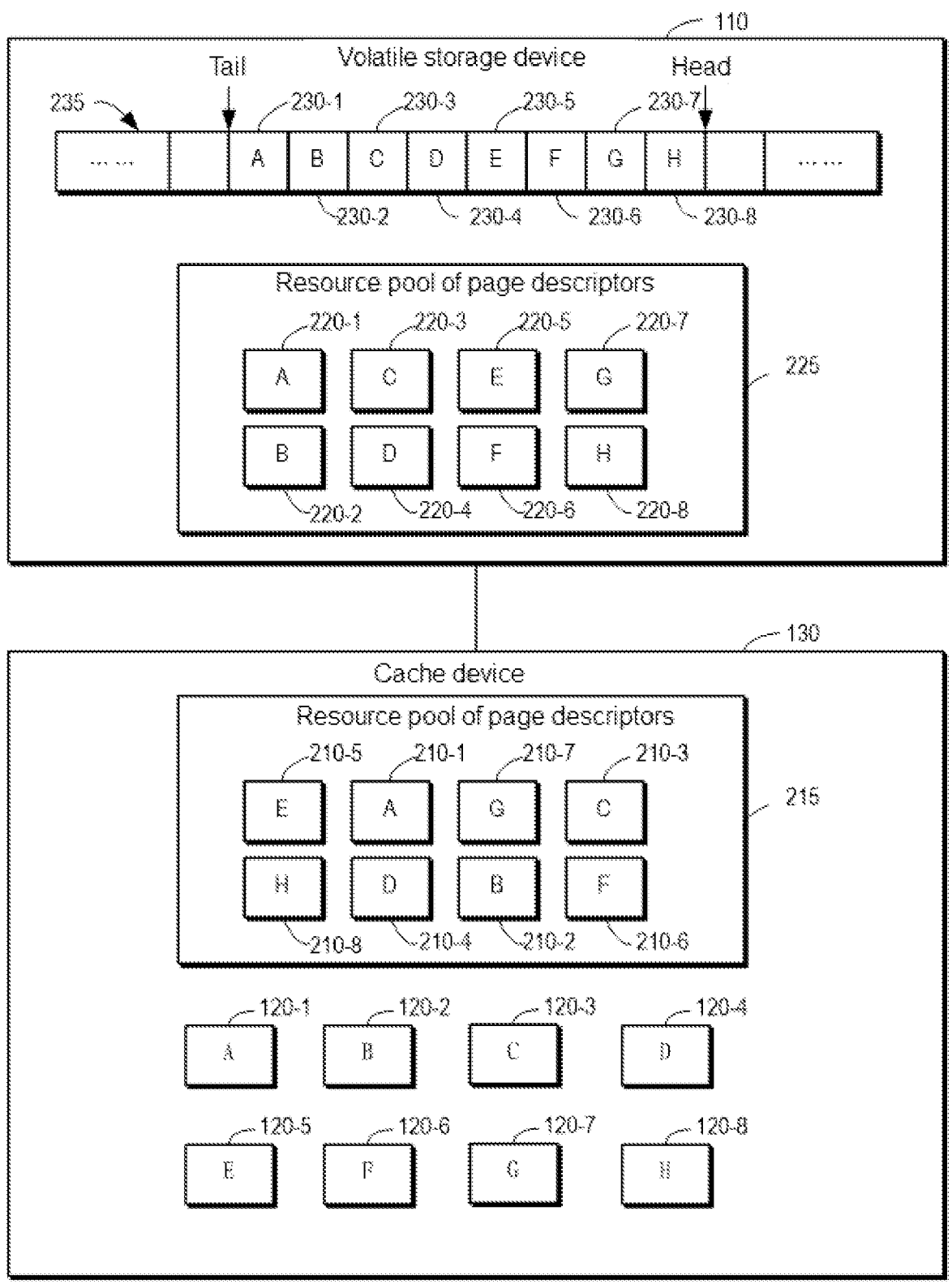
FIG. 2 shows a schematic diagram of a data structure of a storage system according to some embodiments of the present disclosure.

The example embodiments of the present disclosure will be described in detail below in combination with FIGS. 2 to 11. FIG. 2 shows a schematic diagram of a data structure of storage system 100 according to some embodiments of the present disclosure. Resource pool 215 in cache device 130 is configured to provide a resource for storing the page descriptor of page 120 in cache device 130. FIG. 2 shows page descriptors 210-1 to 210-8 of page 120, which may also be collectively or individually referred to as "page descriptor 210." Page descriptor 210 may have a size of 512 bytes. For illustration purpose only, page descriptor 210 and page 120 described thereby are identified with the same letter. For example, page descriptors 210-1, 210-2, 210-3, 210-4, 210-5, 210-6, 210-7, and 210-8 are used to describe pages 120-1, 120-2, 120-3, 120-4, 120-5, 120-6, 120-7, and 120-8 respectively.

Volatile storage device 110 stores page descriptors 220-1 to 220-8 of page 120, which may also be collectively or individually referred to as "page descriptor 220." Page descriptor 220 may be regarded as a copy of page descriptor 210. To this end, resource pool 225 in volatile storage device 110 is configured to provide a resource for storing page descriptor 220 of page 120 in volatile storage device 110. Page descriptor 220 may have a size of 512 bytes. For illustration purpose only, page descriptor 220 and page 120 described thereby are identified with the same letter. For example, page descriptors 220-1, 220-2, 220-3, 220-4, 220-5, 220-6, 220-7, and 220-8 are used to describe pages 120-1, 120-2, 120-3, 120-4, 120-5, 120-6, 120-7, and 120-8 respectively.

Compared with the queue, by using the resource pool to manage page descriptors 210 and 220, more flexible and efficient resource allocation and release can be achieved. However, the resource pool cannot maintain the time sequence between the pages described by the page descriptors. The time sequence is critical when dealing with dependencies between the pages (for example, generated by snapshots). For this reason, auxiliary descriptors 230-1, 230-2, 230-3, 230-4, 230-5, 230-6, 230-7, and 230-8 of page 120 are stored in volatile storage device 110, which may also be collectively or individually referred to as "auxiliary descriptor 230." Auxiliary descriptor 230 of page 120 is configured to describe page descriptor 210 and page descriptor 220 of page 120. In other words, the auxiliary descriptor described herein is a descriptor of the page descriptor. For illustration purpose only, auxiliary descriptor 230 and page descriptor 220, page descriptor 210, and page 120 described thereby are identified with the same letter. For example, auxiliary descriptors 230-1, 230-2, 230-3, 230-4, 230-5, 230-6, 230-7, and 230-8 correspond to pages 120-1, 120-2, 120-3, 120-4, 120-5, 120-6, 120-7, and 120-8 respectively.

In queue 235 (for example, a circular queue) of auxiliary descriptors 230, auxiliary descriptors 230 are arranged in a time sequence in which corresponding pages 120 are written into storage system 100 or are modified. For example, auxiliary descriptor 230-8 is located at the head of the queue, which means that corresponding page 120-8 is the latest page. Auxiliary descriptor 230-1 is located at the tail of the queue, which means that corresponding page 120-1 is the oldest page. Using auxiliary descriptors, storage system 110 can still maintain the time sequence between the pages, so that operations related to the dependencies between the pages are not affected.

In some embodiments, the size of auxiliary descriptor 230 may be smaller than the size of page descriptors 220 and 230. For example, in the case where page descriptors 220 and 230 have a size of 512 bytes, auxiliary descriptor 230 may have a size of 16 bytes. It should be understood that numerical values described here are merely examples and not intended to limit the scope of the present disclosure. The size of different page descriptors and auxiliary descriptors can be set according to specific application scenarios.

In order to solve the problem of slow movement of the queue, queue 235 may be overprovisioned. That is, the storage space allocated to queue 235 of auxiliary descriptor 230 may be redundant. It can be understood that the greater the redundancy of queue 235, the less likely queue 235 is to be saturated.

In some embodiments, the number of auxiliary descriptors that queue 235 can hold may be a multiple N of the number of page descriptors that resource pool 225 and resource pool 215 can store. The multiple N is greater than 1, for example, it may be 2 times, 4 times, 8 times, 10 times, etc. Again, the numerical values are merely examples.

Since the size of auxiliary descriptor 230 may be much smaller than that of page descriptors 210 and 220, an additional storage overhead for the overprovisioning of queue 235 is limited. Table 1 shows the additional storage overhead for the overprovisioning of queue 235 by a different multiple N when auxiliary descriptor 230 has a size of 16 bytes.

TABLE 1

| Additional storage overhead for overprovisioning | |
|---|---|
| Overprovisioning by multiple N | Additional storage overhead |
| 2 | 6.25% |
| 4 | 12.5% |
| 8 | 25% |

Although FIG. 2 shows page descriptor 220 in volatile storage device 110 and page descriptor 210 in cache device 130, it should be understood that this is only by way of example and is not intended to limit the scope of the present disclosure. The page descriptor may be stored in any suitable storage device of storage system 100. The page descriptor can be maintained in only one type of storage device. For example, in some embodiments, page descriptor 210 may be maintained only in cache device 130, and there is no page descriptor 220 in volatile storage device 110.

Figure 3:
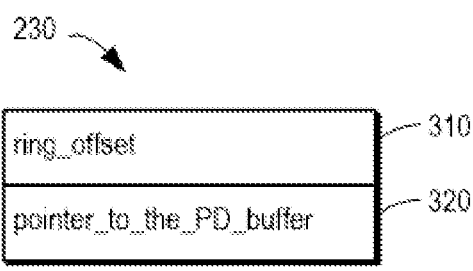
FIG. 3 shows a schematic diagram of an auxiliary descriptor according to some embodiments of the present disclosure.

Auxiliary descriptor 230 may have any suitable element to describe the page descriptor. In some embodiments, auxiliary descriptor 230 may indicate the position of auxiliary descriptor 230 itself in queue 235 and the position of the described page descriptor 220 in resource pool 225. For example, auxiliary descriptor 230-1 may indicate the position of auxiliary descriptor 230-1 itself in queue 235 and the position of the described page descriptor 220-1 in resource pool 225. FIG. 3 shows a schematic diagram of auxiliary descriptor 230 according to some embodiments of the present disclosure. "ring_offset" element 310 indicates the offset of auxiliary descriptor 230 itself in queue 235, for example, the offset relative to the tail. "pointer_to_the_PD_buffer" element 320 indicates the position of the described page descriptor 220 in resource pool 225, for example, a pointer to page descriptor 220.

Additionally, in some embodiments, auxiliary descriptor 230 may further indicate the position of the described page descriptor 210 in resource pool 215. For example, auxiliary descriptor 230-1 may further indicate the position of the described page descriptor 210-1 in resource pool 215. In addition, in an embodiment without page descriptor 220 in volatile storage device 110, auxiliary descriptor 230 may indicate the position of auxiliary descriptor 230 itself in queue 235 and the position of the described page descriptor 210 in resource pool 215. For example, auxiliary descriptor 230-1 may indicate the position of auxiliary descriptor 230-1 itself in queue 235 and the position of the described page descriptor 210-1 in resource pool 215.

Figure 4:
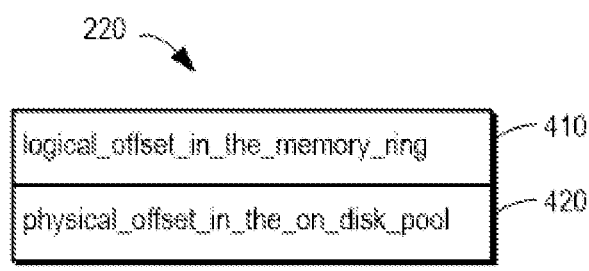
FIG. 4 shows a schematic diagram of a page descriptor according to some embodiments of the present disclosure.

Correspondingly, page descriptor 220 may have any suitable element to indicate the auxiliary descriptor describing it and another page descriptor describing the same page as it does. In some embodiments, page descriptor 220 may indicate the position (for example, the logical position) of auxiliary descriptor 230 describing it in queue 235, and the position of page descriptor 210 describing the same page as page descriptor 220 does in resource pool 215. For example, page descriptor 220-1 may indicate the position of auxiliary descriptor 230-1 in queue 235 and the position of page descriptor 210-1 in resource pool 215. FIG. 4 shows a schematic diagram of page descriptor 220 according to some embodiments of the present disclosure. "logical_offset_in_the_memory_ring" element 410 indicates the position (for example, the logical offset) of auxiliary descriptor 230 describing it in queue 235. "physical_offset_in_the_on_disk_pool" element 420 indicates the position (for example, the physical offset in resource pool 215) of page descriptor 210 describing the same page as page descriptor 220 does in resource pool 215.

In an embodiment where both page descriptor 220 and page descriptor 210 are maintained in storage system 110, page descriptor 210 may have the same elements as page descriptor 220 does. In an embodiment without page descriptor 220, page descriptor 210 may indicate the position (for example, the logical position) of auxiliary descriptor 230 describing it in queue 235 and the position of page descriptor 210 itself in resource pool 215.

It should be understood that the elements of the auxiliary descriptor and the page descriptor shown in FIGS. 3 and 4 are merely examples. In the embodiments of the present disclosure, the auxiliary descriptor and the page descriptor may include any suitable elements to indicate the associated descriptor, page, and the like.

Figure 5:
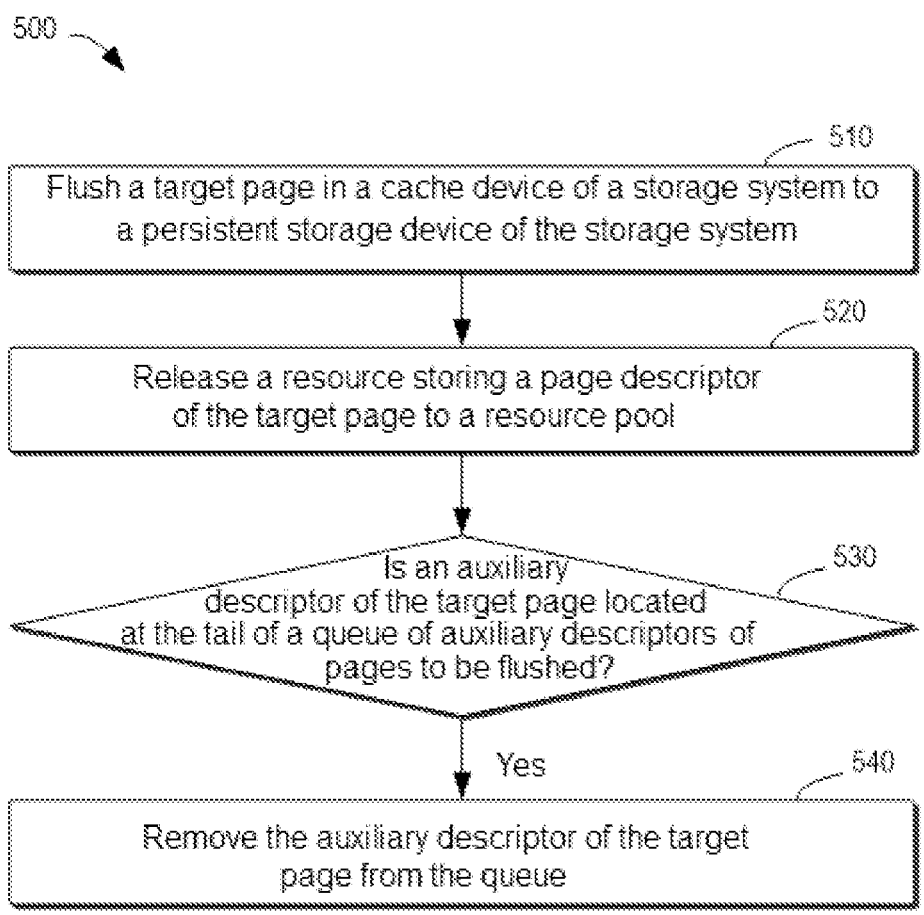
FIG. 5 shows a flowchart of an example method for managing a storage system according to the embodiments of the present disclosure.

FIG. 5 shows a flowchart of example method 500 for managing a storage system according to an embodiment of the present disclosure. Method 500, for example, may be implemented at storage system 100 shown in FIG. 1 using a data structure shown in FIG. 2. It should be understood that method 500 may also include additional actions not shown and/or omit actions shown, and the scope of the present disclosure is not limited in this regard. Method 500 is described in detail below in combination with FIGS. 1 and 2.

Figure 6:
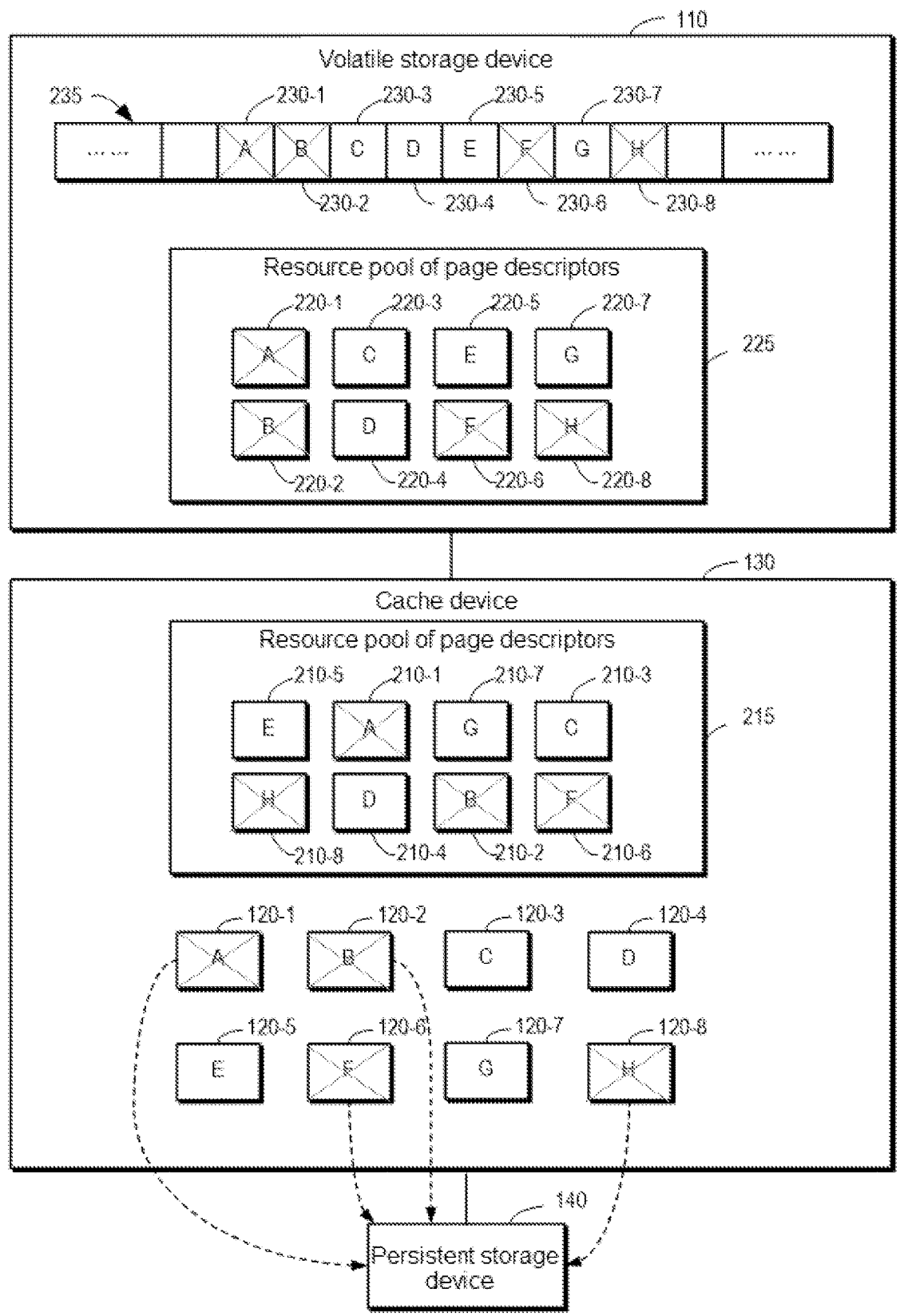
FIG. 6 shows a schematic diagram of a data structure of a storage system after page flushing according to some embodiments of the present disclosure.

At block 510, a target page in cache device 130 of storage system 110 is flushed to persistent storage device 140 of storage system 110. The target page described here may refer to any page among the pages flushed in one flush cycle. The target page may be selected from pages 120 to be flushed shown in FIG. 2. How to select a target page from pages 120 will be described below with reference to FIGS. 7 to 10. Reference is now made to FIG. 6. As shown in FIG. 6, pages 120-1, 120-2, 120-6, and 120-8 are selected as target pages and flushed to persistent storage device 140.

In response to a target page being flushed to persistent storage device 140, at block 520, a resource storing a page descriptor of the target page is released to the resource pool. For example, as shown in FIG. 6, resources used to store page descriptors 210-1, 210-2, 210-6, and 210-8 are released to resource pool 215. Likewise, resources used to store page descriptors 220-1, 220-2, 220-6, and 220-8 are released to resource pool 225.

By using the resource pools to manage the resources used to store page descriptors 210 and 220, once a page is flushed to the back end, the resources used to store page description of the page can be directly released without considering the time sequence of the flushed page and pages that have not been flushed. The resources released to the resource pools can be used immediately for other transactions, such as being used to store page descriptors of newly written pages.

Reference is continuously made to FIG. 5. In response to the target page being flushed to persistent storage device 140, at block 530, whether the auxiliary descriptor of the target page is located at the tail of queue 235 of auxiliary descriptors is determined. If it is determined at block 530 that the auxiliary descriptor of the target page is located at the tail of queue 235 of auxiliary descriptors, method 500 proceeds to block 540. At block 540, the auxiliary descriptor of the target page is removed from queue 235. That is, in this case, the tail of queue 235 can move forward. If it is determined at block 530 that the auxiliary descriptor of the target page is located at the tail of queue 235 of auxiliary descriptors, the tail of queue 235 does not move forward.

Reference is continuously made to an example of FIG. 6. After page 120-1 is flushed, auxiliary descriptor 230-1 of page 120-1 is removed from queue 235. In this way, the tail of queue 235 moves forward. The storage space originally used to store auxiliary descriptor 230-1 becomes available. Subsequently, after page 120-2 is flushed, auxiliary descriptor 230-2 of page 120-2 is removed from queue 235. In this way, the tail of queue 235 moves forward again. The storage space originally used to store auxiliary descriptor 230-2 becomes available.

Since pages 120-3, 120-4, and 120-5 are not flushed, corresponding auxiliary descriptors 230-3, 230-4, and 230-5 are still located in queue 235. Therefore, after page 120-6 is flushed, the tail of queue 235 cannot continue to move. In this case, the storage space used to store auxiliary descriptor 230-6 is still unavailable. Similarly, after page 120-8 is flushed, the storage space used to store auxiliary descriptor 230-8 is still unavailable. Nevertheless, in the case where queue 235 is overprovisioned, there may be sufficient storage space for newly arrived data.

It should be understood that the sequence of all blocks shown in FIG. 5 is merely an example and not intended to limit the scope of the present disclosure. In some embodiments, all the blocks may not be executed in the sequence shown in FIG. 5. For example, block 520 may be executed in parallel with the combination of blocks 530 and 540. For another example, blocks 530 and 540 may be executed before block 520.

Method 500 may also include blocks or steps that are not shown. In some embodiments, storage system 110 may receive (for example, from a user device) or generate a new page. The new page is stored in cache device 130. Accordingly, a resource can be allocated from the resource pool to store a page descriptor of the new page, and an auxiliary descriptor of the new page can be added to the head of queue 235. For example, a resource may be allocated from resource pool 215 to store the page descriptor of the new page in cache device 130. A resource may be allocated from resource pool 225 to store the page descriptor of the new page in volatile storage device 110. The allocated resources, for example, may be resources released due to flushing of any one of pages 120-1, 120-2, 120-6, and 120-8.

Figure 7:
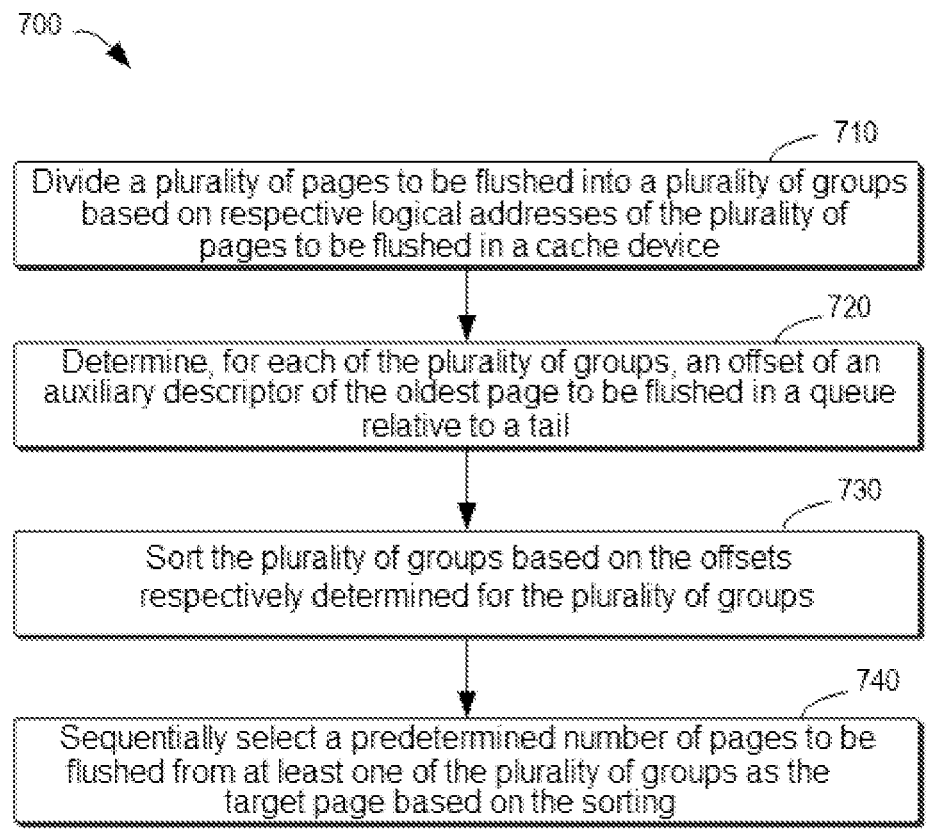
FIG. 7 shows a flowchart of an example method for selecting a target page according to some embodiments of the present disclosure.

As mentioned above with reference to block 510, the flushed target page is selected from pages 120 to be flushed. Some embodiments of how to select a target page to be flushed to persistent storage device 140 are described below. FIG. 7 shows a flowchart of example method 700 for selecting a target page according to some embodiments of the present disclosure. Method 700 may be regarded as additional steps of method 500. It should be understood that method 700 may further include an additional action that is not shown and/or may omit an action that is shown, and the scope of the present disclosure is not limited in this regard. Method 700 is described in detail below in combination with FIGS. 1 and 2.

At block 710, a plurality of pages 120 to be flushed are divided into a plurality of groups based on respective logical addresses of the plurality of pages 120 to be flushed in cache device 130. The logical addresses of the pages to be flushed in the same group are located in the same address range, and the plurality of groups correspond to different address ranges. The logical address of page 120, for example, may be a logical block address (LBA).

Figure 8:
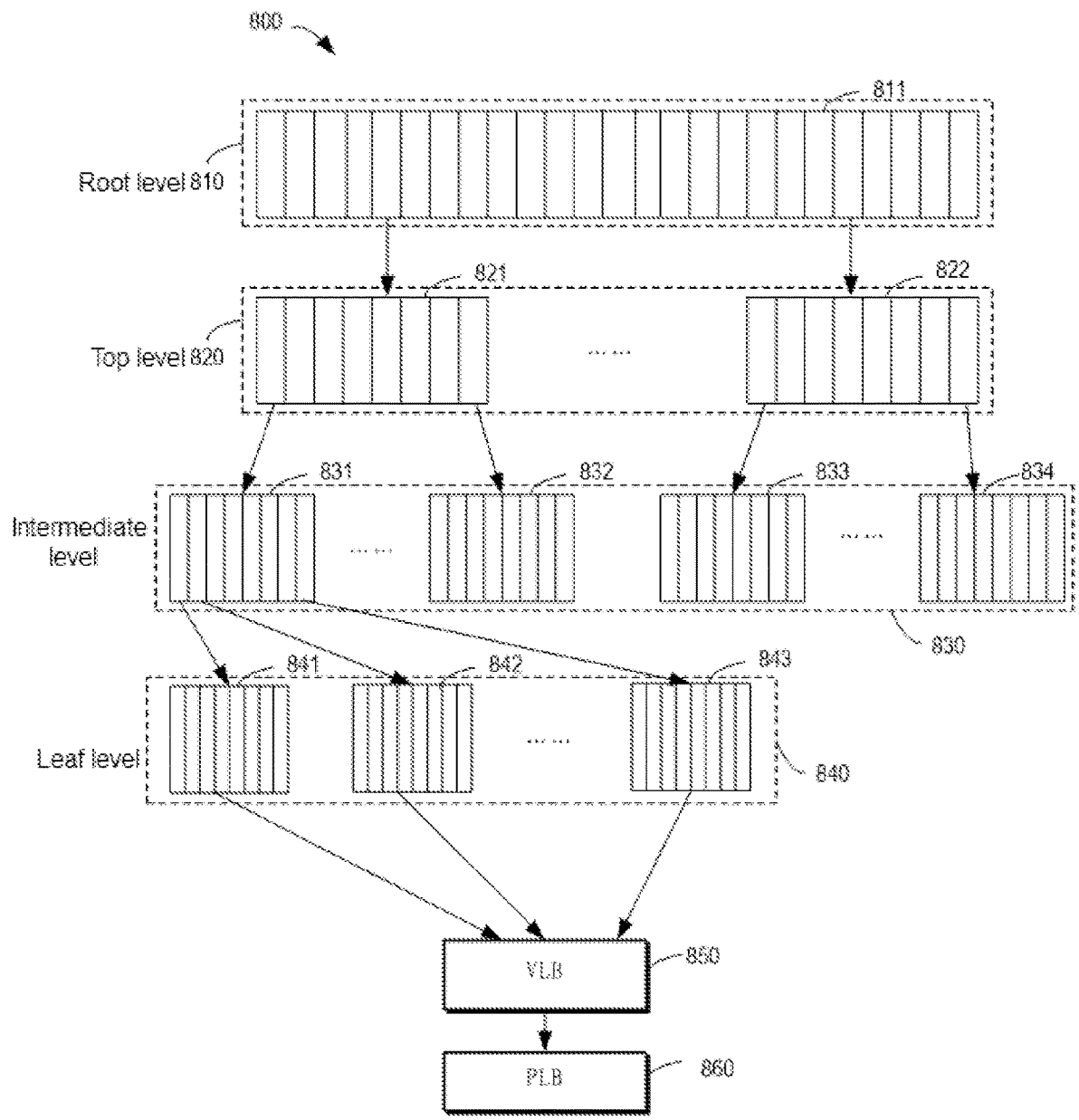
FIG. 8 shows a schematic diagram of a mapping tree according to some embodiments of the present disclosure.

Reference is now made to FIG. 8. FIG. 8 shows a schematic diagram of mapping tree 800 according to some embodiments of the present disclosure. As shown in FIG. 8, mapping tree 800 includes root level 810, top level 820, intermediate level 830, and leaf level 840, which maps continuous LBAs to virtual large block (VLB) 850 and physical large block (PLB) 860.

As shown in FIG. 8, address range 811 of the root level may be divided into a plurality of address ranges of the top level, for example, including address ranges 821 and 822 of the top level. Each address range of the top level can be divided into a plurality of address ranges of the intermediate level. For example, address range 821 of the top level may include address ranges 831, 832, and the like of the intermediate level. For another example, address range 822 of the top level may include address ranges 833, 834, and the like of the intermediate level. An address range of the intermediate level can also be divided into a plurality of address ranges of the leaf level. For example, address range 831 of the intermediate level includes address ranges 841, 842, 843, and the like of the leaf level. As an example and not intended to limit, the address range of the top level may be a continuous 512 GB logical space, the address range of the intermediate level may be a continuous 1 GB logical space, and the address range of the leaf level may be a continuous 2 MB logical space.

It can be determined, based on the LBA of a page, which address range of the top level the page belongs to, which address range of the intermediate level the page belongs to, and which address range of the leaf level the page belongs to. When the page is flushed to persistent storage device 130, the mapping from LBA to VLB and PLB needs to be updated. Therefore, it is necessary to pass from root level 810 of mapping tree 800 down through top level 820, intermediate level 830, and leaf level 840 to VLB 850 and PLB 860.

In view of this, if the flushed target pages are located in the same address range as much as possible, the overhead for searching mapping tree 800 can be reduced. For this reason, a plurality of pages 120 to be flushed can be divided into a plurality of groups based on respective LBAs of the plurality of pages 120 to be flushed, so that the LBAs of the pages to be flushed in the same group are located in the same address range, and the plurality of groups correspond to different address ranges.

In some embodiments, the LBAs of the pages to be flushed in the same group may be located in the same address range of the intermediate level. In other words, the pages to be flushed in the same group belong to the same intermediate-level subtree.

In some embodiments, the LBAs of the pages to be flushed in the same group may be located in the same address range of the top level. In other words, the pages to be flushed in the same group belong to the same top-level subtree. The advantages of such embodiments will be described in detail below.

Figure 9:
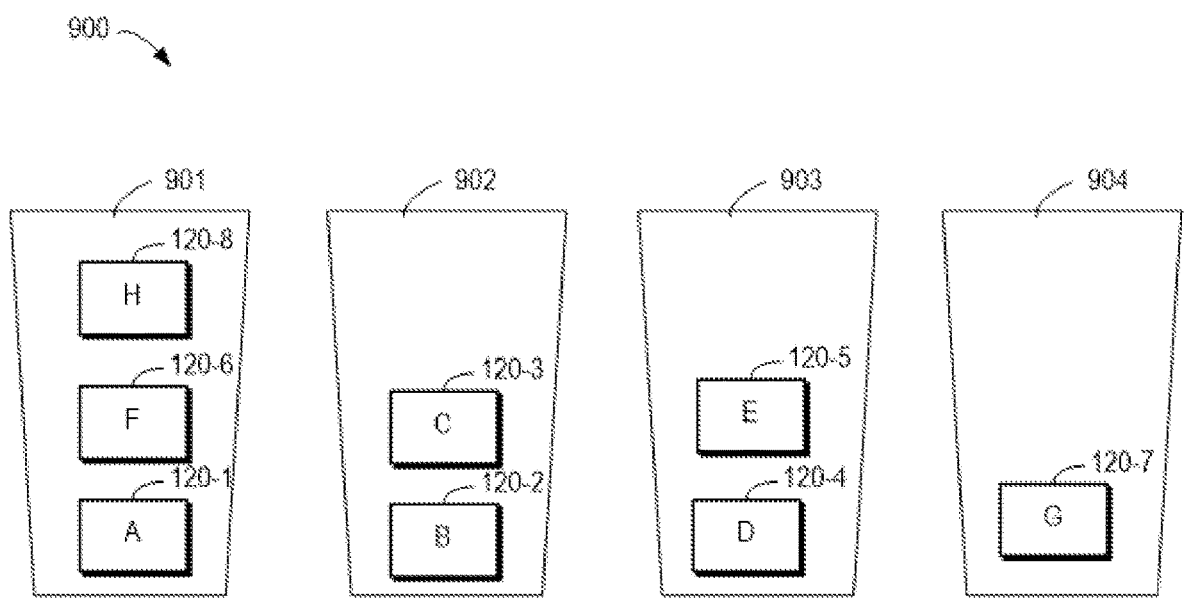
FIG. 9 shows a schematic diagram of a grouping result according to some embodiments of the present disclosure.

Reference is made to FIG. 9. FIG. 9 shows a schematic diagram of grouping result 900 according to some embodiments of the present disclosure. In an example of FIG. 9, pages 120 to be flushed are divided into four groups, including first group 901, second group 902, third group 903, and fourth group 904. The logical addresses of pages 120-1, 120-6, and 120-8 to be flushed in first group 901 are located in a first address range. The logical addresses of pages 120-2 and 120-3 to be flushed in second group 902 are located in a second address range. The logical addresses of pages 120-4 and 120-5 to be flushed in third group 903 are located in a third address range. The logical address of page 120-7 to be flushed in fourth group 904 is located in a fourth address range. It can be understood that the first, second, third, and fourth address ranges are different from each other.

In some embodiments, the first, second, third, and fourth address ranges may be address ranges of the top level. For example, the logical addresses of pages 120-1, 120-6, and 120-8 to be flushed in first group 901 may be located in address range 821 of the top level, while the logical addresses of pages 120-2 and 120-3 to be flushed in second group 902 may be located in address range 822 of the top level.

Reference is made back to FIG. 7. After a plurality of pages 120 to be flushed are grouped, based on the position of auxiliary descriptors 230 of the pages to be flushed in each group in queue 235, a predetermined number of pages can be selected from at least one of the plurality of groups so as to be flushed to persistent storage device 140. The predetermined number described here may refer to the number of pages to be flushed in one flush cycle.

In some embodiments, the average offset of auxiliary descriptors 230 of the pages to be flushed in the group relative to the tail of queue 235 may be determined for each group. Then, the pages in the plurality of groups can be flushed sequentially based on the value of the average offset. For example, the pages in the group with the smallest average offset may be flushed first, and then the pages in the group with the second-smallest average offset may be flushed until the predetermined number is reached.

In some embodiments, the plurality of groups may be sorted based on the offset of the oldest page to be flushed in each group relative to the tail of queue 235. Blocks 720 to 740 in FIG. 7 describe such an embodiment.

At block 720, the offset of auxiliary descriptor 230 of the oldest page to be flushed relative to the tail in queue 235 may be determined for each of the plurality of groups. At block 730, the plurality of groups may be sorted based on the offsets respectively determined for the plurality of groups. At block 740, a predetermined number of pages to be flushed may be sequentially selected from at least one of the plurality of groups as the target page based on the sorting.

Such an example will be described with reference to FIGS. 9 and 10. It can be seen in combination with FIG. 2 that in first group 901, page 120-1 is the oldest page to be flushed, and its offset relative to the tail of queue 235 is 0. In second group 902, page 120-2 is the oldest page to be flushed, and its offset relative to the tail of queue 235 is 1. In third group 903, page 120-4 is the oldest page to be flushed, and its offset relative to the tail of queue 235 is 3. In fourth group 904, page 120-7 is the oldest page to be flushed, and its offset relative to the tail of queue 235 is 6.

Figure 10:
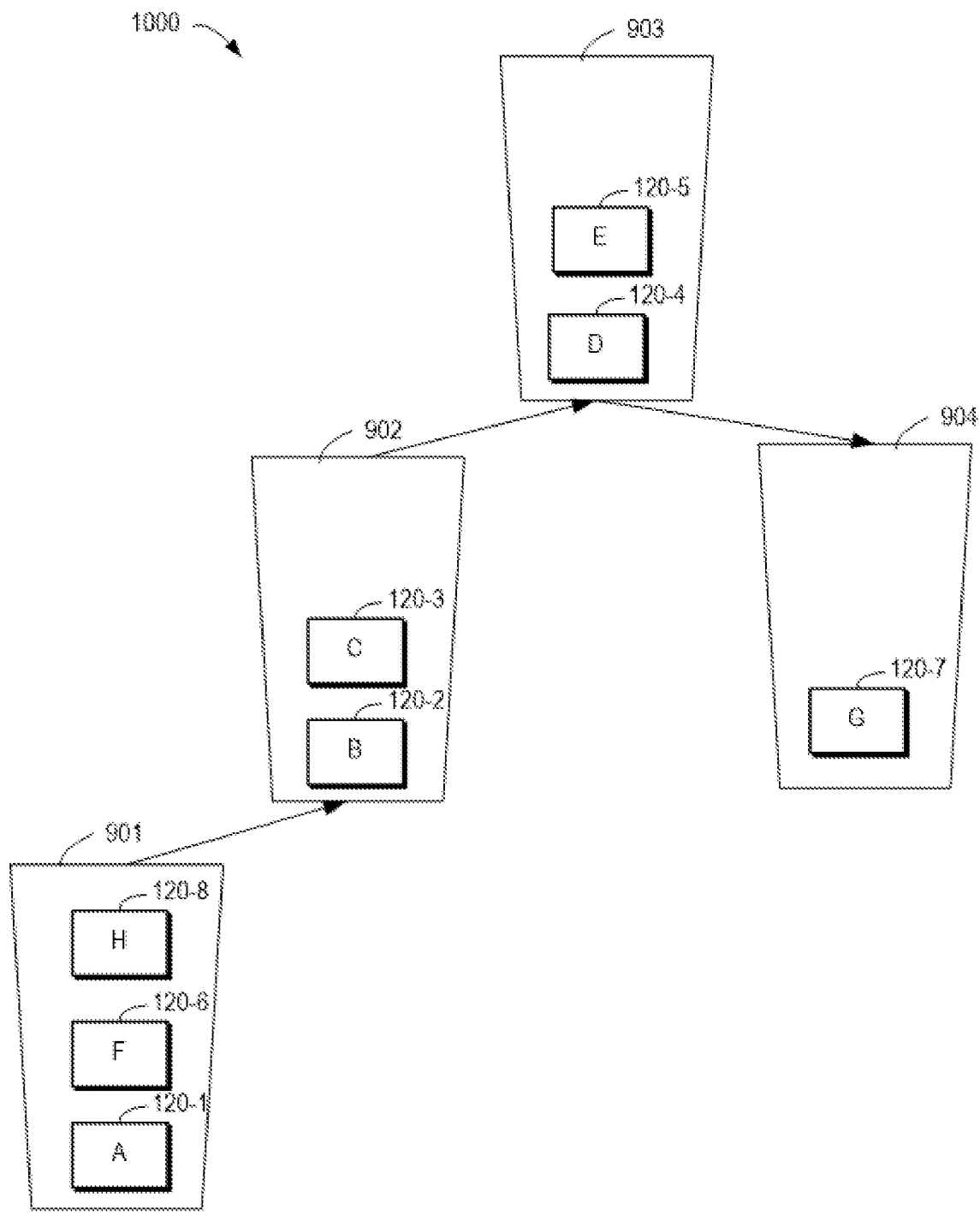
FIG. 10 shows a schematic diagram of a sorting result according to some embodiments of the present disclosure.

Based on the above-mentioned offset values respectively determined for first group 901, second group 902, second group 903, and fourth group 904, the groups are sorted, and sorting result 1000 shown in FIG. 10 can be obtained. FIG. 10 shows a schematic diagram of sorting result 1000 according to some embodiments of the present disclosure. FIG. 10 shows the sorting result in a binary tree mode, and it should be understood that this is merely an example and not intended to be limiting. In the embodiment of the present disclosure, other modes (for example, a linked list) may also be used to maintain the sorting result.

As shown by arrows in FIG. 10, first group 901 is sorted to be the first, and fourth group 904 is sorted to be the last. Accordingly, flushing can be performed sequentially starting from the pages in first group 901. After the current group is empty, move to the next group to perform the flushing operation until reaching the flushed position of a predetermined number of pages. For example, the pages, namely pages 120-1, 120-6, and 120-8, in first group 901 are flushed first. After first group 901 is empty, move to second group 902. When the predetermined number is 4, the oldest page to be flushed in second group 902 (that is, the page whose auxiliary descriptor is closest to the tail), that is, page 120-2, is flushed to persistent storage device 130. This example is shown in FIG. 6. In the case where the predetermined number is greater than 4, the remaining pages such as page 120-3 in second group 902 will continue to be flushed.

The embodiments of flushing pages based on group sorting are described above. This can make the flushed pages come from the same address range as much as possible. In this way, the consumption of updating a mapping tree can be reduced. Especially, this embodiment has additional advantages when the address range is an address range of the top level.

If addresses of pages flushed in one flush cycle are located in different address ranges of the top level, then different transactions are required to handle flushing of the pages. For example, if the logical address of a flushed first page is located in address range 821 of the top level, and the logical address of the next flushed second page is located in address range 822 of the top level, then two different transactions are required to handle flushing of the first page and the second page. In this case, the locality of the flushed page is poor. In addition, as the number of transactions increases, the flushing performance will be reduced.

In a conventional solution, moving the tail of the queue of the page descriptors forward after flushing takes precedence over flushing efficiency, which in turn depends on the locality of the flushed pages. In contrast, in the embodiments of the present disclosure, the queue of the auxiliary descriptors can be overprovisioned. Therefore, moving the tail of the queue of the auxiliary descriptors forward as much as possible is no longer the primary influencing factor. In this case, the pages to be flushed can be grouped according to the address range of the top level. As a result, the locality of the flushed pages is improved. In this way, the number of flushing transactions can be minimized so as to further improve the performance of the storage system.

Take a test in which the queue of the auxiliary descriptors is overprovisioned by 5 times as an example. In the case of grouping the pages to be flushed according to the address range of the intermediate level, the average number of transactions submitted in each flush cycle is 23. In contrast, in the case of grouping the pages to be flushed according to the address range of the top level, the average number of transactions submitted in each flush cycle is decreased to 13.

Figure 11:
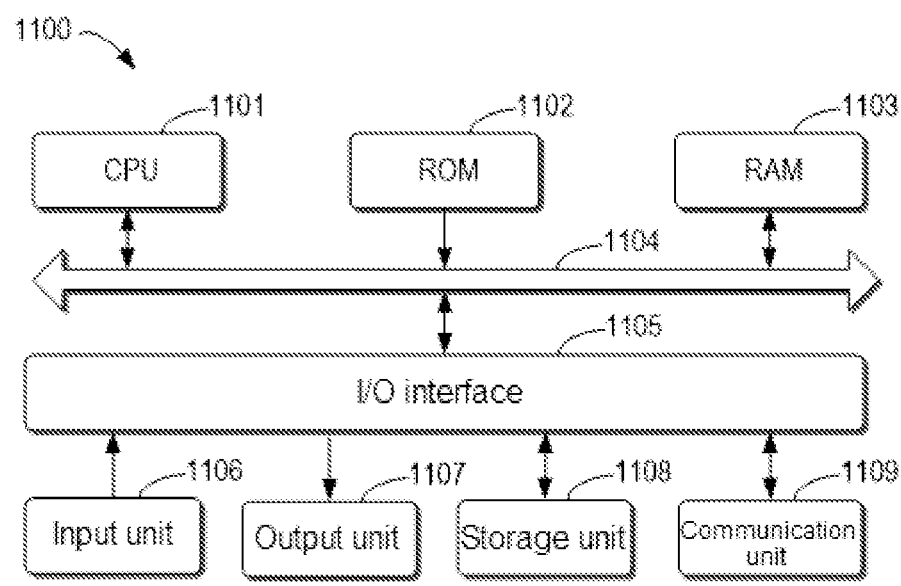
FIG. 11 shows a block diagram of an example device that may be configured to implement the embodiments of the present disclosure.

FIG. 11 shows a schematic block diagram of example device 1100 that may be configured to implement the embodiments of the present disclosure. As shown in the FIG. 11, device 1100 includes central processing unit (CPU) 1101 that may perform various appropriate actions and processing according to computer program instructions stored in read-only memory (ROM) 1102 or computer program instructions loaded from storage unit 1108 to random access memory (RAM) 1103. In RAM 1103, various programs and data required for the operation of device 1100 may also be stored. CPU 1101, ROM 1102, and RAM 1103 are connected to each other through bus 1104. Input/output (I/O) interface 1105 is also connected to bus 1104.

Multiple components in device 1100 are connected to I/O interface 1105, including: input unit 1106, such as a keyboard and a mouse; output unit 1107, such as various types of displays and speakers; storage unit 1108, such as a magnetic disk and an optical disk; and communication unit 1109, such as a network card, a modem, and a wireless communication transceiver. Communication unit 1109 allows device 1100 to exchange information/data with other devices through a computer network such as the Internet and/or various telecommunication networks.

Various processes and processing described above, such as methods 500 and 700, may be performed by processing unit 1101. For example, in some embodiments, methods 200 and 700 may be implemented as a computer software program that is tangibly included in a machine-readable medium such as storage unit 1108. In some embodiments, part or all of the computer program may be loaded and/or mounted to device 1100 via ROM 1102 and/or communication unit 1109. When the computer program is loaded to RAM 1103 and executed by CPU 1101, one or more actions in methods 200 and 700 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, an instruction set architecture (ISA) instructions, machine instructions, machine-dependent instructions, microcode, firmware instructions, state setting data, or source code or object code written in any combination of one or more programming languages, including an object oriented programming language, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, and the module, program segment, or part of the instruction include one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

Various embodiments of the present disclosure have been described above. The foregoing description is by way of example and not exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
  dividing a plurality of pages to be flushed into a plurality of groups based on respective logical addresses of the plurality of pages to be flushed in a cache device of the storage system, the logical addresses of the pages to be flushed in the same group being located in the same address range, and the plurality of groups corresponding to different address ranges;
  selecting a predetermined number of the target pages from at least one of the plurality of groups based on positions of the auxiliary descriptors of the pages to be flushed in each group in the queue;
  flushing a target page in the cache device to a persistent storage device of the storage system;
  releasing a resource storing a page descriptor of the target page to a resource pool, the resource pool being configured to provide resources to store page descriptors of pages to be flushed in the cache device; and
  if it is determined that an auxiliary descriptor of the target page is located at a tail of a queue of auxiliary descriptors of the pages to be flushed, removing the auxiliary descriptor of the target page from the queue, the auxiliary descriptors of the pages to be flushed being configured to describe the page descriptors of the pages to be flushed.

2. The method according to claim 1, wherein the number of the auxiliary descriptors that the queue can hold is a multiple of the number of the page descriptors that the resource pool can store, and the multiple is greater than 1.

3. The method according to claim 1, wherein flushing of the pages to be flushed whose logical addresses are located in the different address ranges is handled by different transactions.

4. The method according to claim 1, wherein selecting the predetermined number of the target pages from at least one of the plurality of groups comprises:
   determining, for each of the plurality of groups, an offset of the auxiliary descriptor of an oldest page to be flushed in the queue relative to the tail;
   sorting the plurality of groups based on the offsets respectively determined for the plurality of groups; and
   sequentially selecting the predetermined number of pages to be flushed from at least one of the plurality of groups as the target page based on the sorting.

5. The method according to claim 1, wherein the auxiliary descriptors indicate at least the following:
   a position of the auxiliary descriptor in the queue, and
   a position of the page descriptor in the resource pool.

6. The method according to claim 1, wherein the queue is stored in a volatile storage device of the storage system, and the resource pool is provided by at least one of the following:
   the volatile storage device, or
   the cache device.

7. The method according to claim 1, further comprising:
   if it is determined that an other page is stored in the cache device, allocating a resource from the resource pool to store a page descriptor of the other page; and
   adding an auxiliary descriptor of the other page to a head of the queue.

8. The method according to claim 1, wherein the auxiliary descriptors are smaller than the page descriptors.

9. An electronic device, comprising:
   a processor; and
   a memory coupled to the processor, the memory having instructions stored therein, and the instructions, when executed by the processor, causing the device to execute actions comprising:
   dividing a plurality of pages to be flushed into a plurality of groups based on respective logical addresses of the plurality of pages to be flushed in a cache device of the storage system, the logical addresses of the pages to be flushed in the same group being located in the same address range, and the plurality of groups corresponding to different address ranges;
   selecting a predetermined number of the target pages from at least one of the plurality of groups based on positions of the auxiliary descriptors of the pages to be flushed in each group in the queue;
   flushing a target page in the cache device to a persistent storage device of the storage system;
   releasing a resource storing a page descriptor of the target page to a resource pool, the resource pool being configured to provide resources to store page descriptors of pages to be flushed in the cache device; and
   if it is determined that an auxiliary descriptor of the target page is located at a tail of a queue of auxiliary descriptors of the pages to be flushed, removing the auxiliary descriptor of the target page from the queue, the auxiliary descriptors of the pages to be flushed being configured to describe the page descriptors of the pages to be flushed.

10. The electronic device according to claim 9, wherein the number of the auxiliary descriptors that the queue can hold is a multiple of the number of the page descriptors that the resource pool can store, and the multiple is greater than 1.

11. The electronic device according to claim 9, wherein flushing of the pages to be flushed whose logical addresses are located in the different address ranges is handled by different transactions.

12. The electronic device according to claim 9, wherein selecting the predetermined number of the target pages from at least one of the plurality of groups comprises:
   determining, for each of the plurality of groups, an offset of the auxiliary descriptor of an oldest page to be flushed in the queue relative to the tail;
   sorting the plurality of groups based on the offsets respectively determined for the plurality of groups; and
   sequentially selecting the predetermined number of pages to be flushed from at least one of the plurality of groups as the target page based on the sorting.

13. The electronic device according to claim 9, wherein the auxiliary descriptors indicate at least the following:
   a position of the auxiliary descriptor in the queue, and
   a position of the page descriptor in the resource pool.

14. The electronic device according to claim 9, wherein the queue is stored in a volatile storage device of the storage system, and the resource pool is provided by at least one of the following:
   the volatile storage device, or
   the cache device.

15. The electronic device according to claim 9, wherein the actions further comprise:
   if it is determined that an other page is stored in the cache device, allocating a resource from the resource pool to store a page descriptor of the other page; and
   adding an auxiliary descriptor of the other page to a head of the queue.

16. The electronic device according to claim 9, wherein the auxiliary descriptors are smaller than the page descriptors.

17. A computer program product having a non-transitory computer readable medium which stores a set of instructions to manage a storage system; the set of instructions, when carried out by computerized circuitry, causing the computerized circuitry to perform a method of:
   dividing a plurality of pages to be flushed into a plurality of groups based on respective logical addresses of the plurality of pages to be flushed in a cache device of the storage system, the logical addresses of the pages to be flushed in the same group being located in the same address range, and the plurality of groups corresponding to different address ranges;
   selecting a predetermined number of the target pages from at least one of the plurality of groups based on positions of the auxiliary descriptors of the pages to be flushed in each group in the queue;
   flushing a target page in the cache device to a persistent storage device of the storage system;
   releasing a resource storing a page descriptor of the target page to a resource pool, the resource pool being configured to provide resources to store page descriptors of pages to be flushed in the cache device; and
   if it is determined that an auxiliary descriptor of the target page is located at a tail of a queue of auxiliary descriptors of the pages to be flushed, removing the auxiliary descriptor of the target page from the queue, the auxiliary descriptors of the pages to be flushed being configured to describe the page descriptors of the pages to be flushed.

18. The computer program product according to claim 17, wherein the auxiliary descriptors are smaller than the page descriptors.

19. The computer program product according to claim 17, wherein the number of the auxiliary descriptors that the queue can hold is a multiple of the number of the page descriptors that the resource pool can store, and the multiple is greater than 1.

20. The computer program product according to claim 17, wherein the auxiliary descriptors indicate at least the following:

a position of the auxiliary descriptor in the queue, and a position of the page descriptor in the resource pool.

* * * * *